(12) United States Patent
Ala-laurila et al.

(10) Patent No.: US 10,706,287 B2
(45) Date of Patent: Jul. 7, 2020

(54) METHOD FOR PERFORMING BEHAVIORAL EXPERIMENTS WITH RODENTS

(71) Applicant: Petri Ala-Laurila, Espoo (FI)

(72) Inventors: Petri Ala-laurila, Espoo (FI); Tuomas Turunen, Espoo (FI)

(73) Assignee: Petri Ala-Laurila, Espoo (FI)

( * ) Notice: Subject to any disclaimer, the term of this patent is extended or adjusted under 35 U.S.C. 154(b) by 146 days.

(21) Appl. No.: 15/493,161

(22) Filed: Apr. 21, 2017

(65) Prior Publication Data

US 2017/0308755 A1  Oct. 26, 2017

(30) Foreign Application Priority Data

Apr. 21, 2016 (FI) .................................... 20160105

(51) Int. Cl.
| | | |
|---|---|---|
| G06K 9/00 | (2006.01) | |
| H04N 7/18 | (2006.01) | |
| G06T 7/73 | (2017.01) | |
| A01K 1/03 | (2006.01) | |
| A01K 29/00 | (2006.01) | |
| H04N 5/33 | (2006.01) | |
| H04N 5/225 | (2006.01) | |

(52) U.S. Cl.
CPC ............ *G06K 9/00744* (2013.01); *A01K 1/03* (2013.01); *A01K 29/005* (2013.01); *G06K 9/00342* (2013.01); *G06K 9/00362* (2013.01); *G06K 9/00765* (2013.01); *G06K 9/00771* (2013.01); *G06T 7/74* (2017.01); *H04N 5/33* (2013.01); *H04N 7/183* (2013.01); *H04N 7/188* (2013.01); *G06K 2009/00738* (2013.01); *G06T 2207/10016* (2013.01); *G06T 2207/10048* (2013.01); *H04N 5/2257* (2013.01)

(58) Field of Classification Search
CPC ........... G06K 9/00744; G06K 9/00765; G06K 9/00362; G06K 2009/00738; H04N 7/188; H04N 5/33; H04N 7/183; H04N 5/2257; A01K 1/03; A01K 29/005; G06T 7/74; G06T 2207/10016; G06T 2207/10048

See application file for complete search history.

(56) References Cited

U.S. PATENT DOCUMENTS

| | | | | |
|---|---|---|---|---|
| 2011/0173143 A1* | 7/2011 | Benjamini | ......... | G06K 9/00335 706/12 |
| 2014/0167958 A1* | 6/2014 | Kimchi | .................. | A01K 1/031 340/539.13 |

OTHER PUBLICATIONS

Kretschmer, Friedrich, et al. "Automated determinination of head gaze in rodents." 2012 5th International Congress on Image and Signal Processing. IEEE, 2012. (Year: 2012).*

* cited by examiner

*Primary Examiner* — Tat C Chio
(74) *Attorney, Agent, or Firm* — Jacob Eisenberg

(57) ABSTRACT

The invention relates to behavioral experiments with rodents, and especially to monitoring, data collection and control of such experiments. This invention provides a method for automatically observing the behavior of rodents in a way that provides accurate determination of location and direction of the head of the rodent, even in darkness under infrared light, by determining the location and the direction of the rodent's head on the basis of the triangle formed by the ears and the snout of the rodent.

20 Claims, 2 Drawing Sheets

METHOD FOR PERFORMING BEHAVIORAL EXPERIMENTS WITH RODENTS

BACKGROUND OF THE INVENTION

Field of the Invention

The invention relates to behavioral experiments with rodents, and especially to monitoring, data collection and control of such experiments.

BACKGROUND

Behavioral experiments with rodents are widely used in pharmaceutical and biological sciences. Typically, in such experiments a rodent is released in an enclosed area, often called a maze, and its behavior is followed until the rodent reaches a target area or performs a predefined action, or the experiment is terminated. In many experiments the reaction of the rodent to various types of stimuli are observed, and the movement and actions of the rodent is tracked for later analysis of the effects of stimuli on the rodents. These stimuli can include visual or auditory stimuli, scents, movements of objects, or other types of stimuli.

Many different types of rodents are used in these experiments. For example, different types of mice and rats are commonly used. Transgenic techniques over the recent years (especially in mice) have made it possible to manipulate their biology in a controlled way at a molecular level. The combination of targeted gene manipulations with quantitative tools to understand animal behavior offers a remarkable opportunity in the future to understand the neural correlates of behavior.

Behavioral experiments with rodents require a high amount of manual work. Typically, the placement of rodents in the maze and their removal from the maze are done manually. In a typical experiment certain actions need to be performed between each experiment e.g. to even out scent trails left by the previous rodent in the maze, in order to reduce effects of previous experiments on later experiments.

Since the behavior of an individual rodent in a single experiment can be highly variable, typically a large number of experiments must be run for a single set of experimental parameters in order to collect statistically meaningful results for that set of experimental parameters. A typical experiment series also varies certain experimental parameters such as strength of certain stimuli or other parameters, further compounding the number of experiments that need to be executed. Furthermore, the complex nature of behavior makes it difficult to know a priori how to parametrisize the behavioral outputs. In other words, it is not trivial to know what aspects of the complex behavior to focus at.

Due to the heavily manual nature of the experiments and the need to perform large numbers of individual experiments, behavioral testing with rodents requires a lot of time and manual effort. One direction which has been used so far to help in performing these experiments is monitoring the rodents using video cameras, and analysing the experiments using recorded video. A good example of this approach is described in patent document U.S. Pat. No. 7,817,824 and references therein. The patent document describes a system and a method for animal behavior characterization from top view using video analysis. The patent document describes in detail various ways to process the video signal for analysis of the behavior of rodents, and ways to analyse the behavior.

Despite these advances in the field, performing behavioral experiments using rodents still requires a lot of time and manual work. More efficient methods of performing experiments and collecting data are needed. Further, in some types of behavioral experiments such as experiments regarding the visual system, where the experiments are performed in darkness, existing video camera based solutions often do not work reliably.

SUMMARY OF THE INVENTION

An object of certain embodiments of the invention is to provide a method and a system for performing behavioral experiments with rodents. There is also described a method and a system for performing behavioral experiments with rodents, that eases the amount of work and resources needed to support the experiments. A still further example is to provide a method and a system for performing behavioral experiments with rodents, that reduces the potential of human errors on behalf of the researcher performing the experiments. In addition, more information about the relationship between the behavior of an animal and sensory observations by the animal can be obtained.

According to an embodiment, there is described a method for performing experiments with rodents, in which experiments a rodent is placed in a maze by a researcher and the behavior of the rodent is observed in darkness using infrared light and using a video camera producing a video signal. Such a method can comprise some or all of the following steps: determining, by a computing device, a starting time by determining from video images obtained from the camera, when a predetermined start condition is fulfilled, determining, by a computing device, from a plurality of the video images, where the rodent is and in which direction the head of the rodent is directed in each of said plurality of the video images by determining the location and direction of a triangle defined by the two ears and the snout of the rodent, and determining, by a computing device, an ending time by determining from the video images one or more of the following: when the rodent has reached an end condition, or when the rodent is taken away from the maze.

Additionally there is described a system. A system for performing experiments with rodents in a maze, in darkness under infrared light, the system having a video camera for monitoring rodents in the maze, may comprise some or all of the following components: a controller connected to the video camera and arranged to receive video images from the video camera and to store received video images, said controller being arranged to determine a starting time by determining from video images obtained from the camera when a predetermined start condition is fulfilled, said controller being arranged to determine from a plurality of the video images where the rodent is and in which direction the head of the rodent is directed in each of said plurality of the video images by determining the location and direction of a triangle defined by the two ears and the snout of the rodent, and said controller being arranged to determine an ending time by determining from the video images one or more of the following: when the rodent has reached an end condition, or when the rodent is taken away from the maze.

BRIEF DESCRIPTION OF THE DRAWINGS

Various embodiments of the invention will be described in detail below, by way of example only, with reference to the accompanying drawings, of which

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

A. Certain Embodiments of the Invention

In the following, features of the invention will be described referring to a simple example of an experimental setup with which various embodiments of the invention may be implemented. Only elements relevant for illustrating the embodiments are described in detail. Details that are generally known to a person skilled in the art may not be specifically described herein.

In the following, we describe an embodiment of the invention with reference to FIG. 1.

Figure 1:
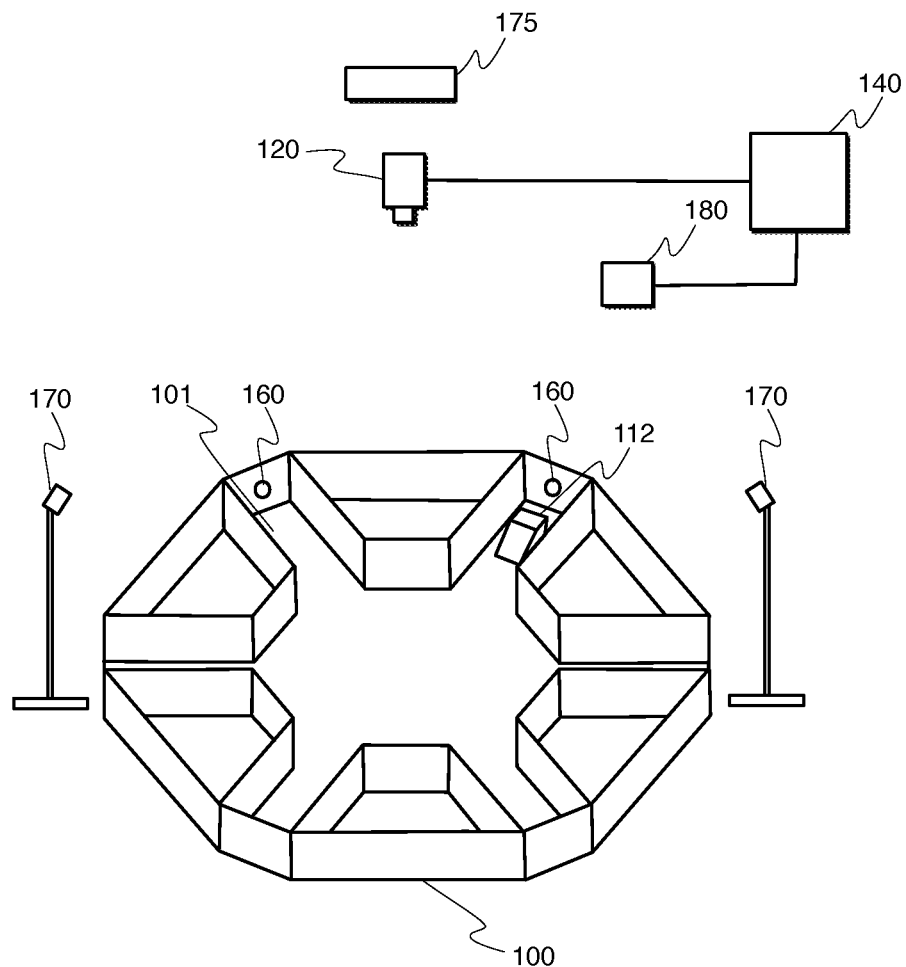
FIG. 1 illustrates an experimental setup that can be used in an embodiment of the invention.

FIG. 1 illustrates a maze 100. In this example the maze is a so-called water maze, which contains water in such a depth that the rodent is forced to swim. This creates a motive for the rodent to search for dry ground, which in the example of FIG. 1 is represented by an escape ramp 112. The water level in the maze can advantageously be higher than the escape ramp, so that the ramp is covered under the water and not visible via reflections.

The shape of the maze in FIG. 1 is only one example of a maze that can be used in an embodiment of the invention. In the example of FIG. 1, the maze has six arms 101 extending from a central area. As a man skilled in the art knows, the shape and size of the maze is implementation dependent i.e. mainly depends on what kind of experiments are desired. In different embodiments of the invention, different maze shapes and configurations can be used. For example, the number of arms 101 may be different than the six in the example of FIG. 1, or the maze can be shaped in an altogether different form. These different shapes can be generated e.g. by building the maze of modular pieces allowing quick and dynamic reshaping of the space (e.g. conversion of the 6-alternative maze into 2-alternative maze).

The experimental setup includes a video camera 120, that provides a stream of video images to a controller 140. The controller receives the video images, and saves them on a memory device. The controller may also analyze the video images, monitor the events on the video images, and determine the location and other properties of the rodent. The controller can be implemented using a single computing device such as a desktop or a laptop computer, or for example using a network of computing devices.

FIG. 1 also illustrates stimulus devices 160 for giving a stimulus to a rodent in the maze. In the example of FIG. 1, the stimulus devices are placed at the ends of the arms 101 of the maze 100. As a man skilled in the art knows, the type of stimulus devices needed is dependent on the type of research being performed. For example, if the research is focused on the visual system of the rodents or various parts of it, the stimulus devices can be for example light emitting diodes, various displays, OLED monitors, or DLP projectors or other devices for creating a controlled amount of light and a desired spatial structure of the simulus. The stimulus devices can also be any other types of stimulus devices known to a man skilled in the art. For example, the stimulus devices can release scents, emit sounds, or create movement or be a combination device stimulating simultaneously multiple sensory modalities, such as a visual stimulus device combined with sound generator or a vibratory stimulus device.

FIG. 1 also illustrates an embodiment of the invention, in which a fan 175 is placed above the maze to move air in the maze in order to increase mixing of air in the maze and reducing scents and any other olfactory cues, so that the path of a rodent from a previous test would not have an effect on the behavior of a rodent in a subsequent test.

Advantageously, the stimulus devices 160 are connected to a stimulus control unit (not shown in FIG. 1) for controlling the emission of stimuli by the stimulus devices 160. The stimulus control unit is advantageously connected to the controller 140 or is implemented as a part of controller 140 in order to allow controlling of the whole experimental setup by the controller 140. Depending of the type of stimulus devices, the stimulus devices may also need driver units to control them. For example, LED (light emission diode) based lighting units are typically driven by separate driver units that provide the voltage and current needed by the LED units. However, these driver units are well known by a man skilled in the art, whereby they are not described in any further detail in this specification.

FIG. 1 illustrates also lights 170 for lighting the maze. The type of lighting is naturally dependent on the type of experiments being performed. For example, if the experiments are related to the visual system of the rodents or various parts of it, whereby some experiments require darkness, the lights can advantageously be infrared a low intensity that cannot be seen by the rodents. In such an experimental arrangement, the researcher can observe the experiment using e.g. infrared night vision goggles.

FIG. 1 also illustrates an indicator 180 for giving a signal to a researcher using the system. The indicator 180 can be a visual indicator such as a lamp or a display, an auditory indicator such as an earpiece, headphones or a loudspeaker, a mechanical indicator such as a vibrating device, or any other device capable of giving an indication observable by a researcher using the system. Preferably, the indicator is arranged so as not to be observable by rodents in the experiments, in order not to have an effect on the experiments. For example, if the experiments are performed in fully lighted conditions, the indicator can be a display that is outside the view of the rodents in the maze. For a further example, if the experiment is performed in darkness, the indicator can be an infrared light observable by the researcher wearing night vision goggles but not observable by the rodent.

Next, we describe an example of a single experimental run using the setup illustrated in FIG. 1. First, the researcher places an enclosure in the middle of the maze, and places the rodent in the enclosure. The enclosure can for example be a piece of circular or rectangular tube, or any other type of enclosure. When the researcher removes the enclosure, the rodent starts searching for a way out of the water. In a typical experimental series, effects of various stimuli are researched, and during a single experimental run a single stimulus or a sequence of stimuli are given. When the rodent finds the escape ramp, the experimental run is finished, and the researcher removes the rodent. Next, in a typical experimental sequence, any scents left by the rodent are removed or evened out by swiping all areas of the maze and mixing the water, so as not to leave a scent trail that might effect the next experimental run.

In this embodiment of the invention, the controller analyzes the video images, and in the beginning of the experimental run searches for the shape of the enclosure in the video images. When the controller has found the enclosure in the video images, it monitors when the researcher removes the enclosure from the maze. Upon detecting the removal of the enclosure, the controller marks the removal time as the starting time of the current experimental run.

The controller can analyze the video images, and in the beginning of the experimental run searches for the rodent in the video images. Advantageously, the searching for the rodent can be initiated from the location of the enclosure, if the location of the enclosure was already found. Upon detecting the rodent, the controller marks the time of detection of the rodent as the starting time of the current experimental run.

The controller can determine the starting time of the current experimental run based on detection of a predetermined starting condition. The predetermined start condition can be for example detection of release of the rodent in the maze, detection of lifting of an enclosure from the maze, detection of placement of an enclosure in the maze, or for example detection of a rodent in an enclosure in the maze, or any other event that is suitable for defining the start of an experimental run according to the needs and objectives of the experiment.

In unoptimal lighting situations, for example in experiments focused on the visual system of the rodents that are performed in darkness, the rodent can be difficult to detect from the images. The difficulty is further increased in experiments using a water maze, since any waves created by the experimental procedure or the rodent itself typically produce reflections that disturb image analysis. In an embodiment of the invention, the search for the rodent in the video images after removal of the enclosure is initiated at the location where the enclosure was. This makes it easier and faster to find the rodent in the images, and decreases the probability of making a false determination.

The controller can also initiate the stimulus sequence for an experimental run automatically after detecting the removal of the enclosure and/or detection of the rodent. This has the advantage that the researcher does not have to start the stimulus or stimulus sequence manually, which reduces the work load and streamlines the performing of the experiments.

According to certain embodiments of the invention, the controller analyses the images and determines the location of the rodent and/or the direction of the rodent's head from a plurality of video images during the experimental run. This allows the controller to change stimulus given to the rodent based on the direction of the rodent's head.

The inventors have had the insight that the ears of a rodent can typically be detected clearly in an image recorded under infrared light having a wavelength of 800 nm or longer, which allows the direction and the location of the head to be determined accurately and robustly by determining the angle and location of the triangle defined by the two ears of the rodent and the snout of the rodent. Using this particular way of determining the location and/or the direction of the head of the rodent has the advantage that it is accurate and robust even in low-contrast, low-quality images, which are typical in observations made in darkness, under infrared light. The inventors have found that this way of determining the location and/or the direction of the head of the rodent is much more accurate than trying to determine the same from an outline of the rodent, which can be difficult to accurately determine especially in low-quality images taken from a water maze, where the waves and the water may obscure the outline of the rodent.

Other methods for detecting a given visual element such as the head of a rodent known by a man skilled in the art can also be used in different embodiments of the invention. For example, one well known method of detecting a visual element is matching a predefined representative image of a visual element to contents of the whole image in order to find the location and rotation angle of the visual element in the image.

Head-tracking makes it possible to change and/or move the stimulus depending on the direction of gaze of the animal. This allows an entire new level of experimental specificity where the stimulus protocol can depend on the actual behavior of the animal. This approach can be used in memory tests, vision tests, olfactory tests, and other tests of various types to allow a fundamentally new level of efficiency in data collection. This is because coupling stimulus protocol to the actual behavior of the animal can be used to reduce variability in the dataset, allows more efficient statistical testing of the data sets and allows the creation of an entire new level of experimentation protocols. The statistical benefit provided by control of the stimulus protocol based on real-time analysis of rodent head movements is that this arrangement provides data that allows the researchers to better classify the observed behaviors, and determine the effects of given stimulus(es) on the behavior of the rodents. This will also make experiments overall faster and more precise. This type of experimental protocol is especially useful when the studied behaviors are affected by multiple variables, as real-time changes of stimulus based on real-time analysis of behavior can be used to better isolate the effect of one variable from others.

According to certain embodiments of the invention, the direction of the head of the rodent is used in analysis of the experimental data, for example, to discard the effect of such stimuli that the rodent has not been able to see, or for example to divide datasets into different groups based on the behavior of the animal during the stimulus presentation.

According to certain embodiments of the invention, the controller monitors when the rodent reaches an end condition. The end condition can be a specific area in the maze, such as the escape ramp. The end condition can also be any other action performed by the rodent that signifies the end of the experimental run. Upon detecting the end condition, the controller advantageously marks the time as the ending time of the experimental run.

According to certain embodiments of the invention, the controller monitors when the rodent is removed from the maze by the researcher. This can be implemented for example by detecting the researcher's hands from the images. The detection of the removal of the rodent can also be used to define the ending time of the experimental run, if the rodent has not already reached an end condition. Such a situation can arise, if the rodent does not find the target, such as the escape ramp, and the researcher needs to intervene and remove the rodent.

According to certain embodiments of the invention, the controller gives indications to the researcher based on an predefined experimental sequence and/or events detected from the video images. For example, if the experimental sequence calls for a specific timing between placement of the rodent in the enclosure and removal of the enclosure, the controller can give an indication to the researcher, when it is time to remove the enclosure. For a further example, the controller can give an indication to the researcher, when the rodent has reached an end condition and needs to be removed from the maze. Giving indications and thereby instructing the researcher improves the efficiency of the experimental work, and reduces probabilities of manual experimental errors. This is advantageous especially in experiments which are conducted in darkness, which limits the ability of the researcher to e.g. easily follow a list of notes.

According to certain embodiments of the invention, the controller creates a video clip of video images between the observed starting time and ending time of the experimental run. Advantageously, the controller stores the video clip for later analysis.

According to certain embodiments of the invention, the controller discards other video images, i.e. video images that do not belong to an experimental run, or marks them as not belonging to an experimental run.

This can provide a considerable advantage for experiment series with large numbers of experimental runs. Video requires large amounts of storage, which is compounded by the operational necessity of always backing up all data and video. Further, having the video material automatically classified as belonging to an experimental run or not markedly reduces manual post processing and analysis workload.

According to certain embodiments of the invention, the controller analyses the location of the rodent in the images during the experimental run, and saves the detected locations in a storage device. Advantageously, the controller can also save other analysis results such as the direction of the rodent's head in the images along with the detected locations. Advantageously, the controller also saves metadata about the experimental run, such as the time and date of the experimental run, along with the analysis results.

The experimental apparatus allows a wide variety of behavioral tests. In an experiment, the experimental arena can advantageously have multiple stimulus devices and the animals will be trained before the experiments to seek a specific type of a stimulus whose effect will be studied in the experiments. The stimulus can consist of a certain type of light (intensity, wavelength, polarization, spatial structure) or a dynamic set of images, sounds, olfactory stimuli and/or other stimulus. The contraints arise only from the stimulus devices that are available for the arena and the sensory cababilities of the animal. Various types of behavioral and memory tests can be run. By combining transgenic manipulations of animals to these experiments, one can test how a particular alteration of the sensory system or the brain impacts behavior. This approach allows to finally try to understand how highly specific aspects of the animal's biology (e.g. presence of certain neurons, or signaling cascades in sensory neurons) impacts its complex behaviour, and memory.

B. Various Further Aspects of the Invention

Figure 2:
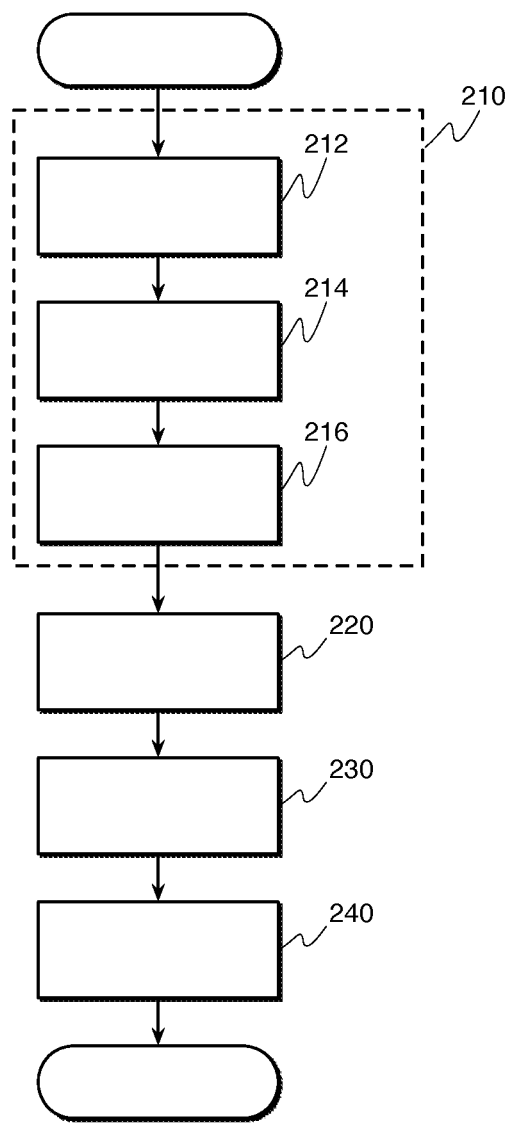
FIG. 2 illustrates a method according to an embodiment of the invention.

According to an example, a method for performing experiments with rodents is provided. This method is illustrated with the help of FIG. 2. In these experiments a rodent is placed in a maze by a researcher and the behavior of the rodent is observed in darkness using infrared light and using a video camera producing a video signal. According to an embodiment of this first aspect of the invention, the method comprises at least the steps of determining 210, by a computing device, a starting time by determining from video images obtained from the camera, when a predetermined start condition is fulfilled, determining 220, by a computing device, from a plurality of the video images, where the rodent is and in which direction the head of the rodent is directed in each of said plurality of the video images by determining the location and direction of a triangle defined by the two ears and the snout of the rodent, and determining 230, by a computing device, an ending time by determining from the video images one or more of the following: when the rodent has reached an end condition, or when the rodent is taken away from the maze.

The predetermined start condition can be for example detection of release of the rodent in the maze, detection of lifting of an enclosure, or for example detection of a rodent in an enclosure in the maze.

Said step of determining 210 of when the rodent is released in the maze can comprises at least the steps of searching 212, by a computing device, for an image of an enclosure from the video images, determining 214, by a computing device, the location of the enclosure from at least one video image, and determining 216, by a computing device, when the researcher removes the enclosure from the maze.

Searching of the rodent in the video images after release of the rodent can be initiated substantially at said determined location of said enclosure.

Methods can further comprises the step of forming 240, by a computing device, a video clip for later storage and analysis from video images between said starting time and said ending time.

Said step of determination of where the rodent is and in which direction the head of the rodent is directed can be performed on the basis of a formed video clip.

The researcher can be given one or more signals according to a predefined experiment sequence.

Methods may further comprises the steps of:
determining, by a computing device, from the video images if a predefined event has occurred,
and if said predefined event has occurred, giving a predefined signal to the researcher.

Methods may further comprises the steps of:
determining, by a computing device, from the video images if a predefined event has occurred,
and if said predefined event has occurred, initiating a countdown of a predetermined time period,
and when said predetermined time period has passed, giving a predefined signal to the researcher.

Methods may further comprises the steps of
determining from the video images if a predefined event has occurred,
and if said predefined event has occurred, initiating a stimulus sequence.

Methods may further comprises the steps of
determining, by a computing device, the direction of the head of the rodent from at least one video image, and
selecting a stimulus to be given at least in part on the basis of the direction of the head of the rodent.

An example of a system for performing experiments with rodents in a maze is provided. Such a system has a video camera for monitoring rodents in the maze. In an embodiment of this second aspect of the invention, the system comprises a controller connected to the video camera and arranged to receive video images from the video camera and to store received video images, said controller being arranged to determine a starting time by determining from video images obtained from the camera when a predetermined start condition is fulfilled, said controller being arranged to determine from a plurality of the video images where the rodent is and in which direction the head of the rodent is directed in each of said plurality of the video images by determining the location and direction of a triangle defined by the two ears and the snout of the rodent, and said controller being arranged to determine an ending time by determining from the video images one or more of the following: when the rodent has reached an end condition, or when the rodent is taken away from the maze.

The predetermined start condition can be for example detection of release of the rodent in the maze, detection of lifting of an enclosure, or for example detection of a rodent in an enclosure in the maze.

Said controller can be arranged to determine when a rodent is released in the maze by searching for an image of an enclosure from the video images, determining the location of the enclosure from at least one video image, and determining when the researcher removes the enclosure from the maze.

Said controller can be arranged to initiate a search for a rodent in the video images substantially at said determined location of said enclosure.

Said controller can be arranged to form a video clip for later storage and analysis from video images between said starting time and said ending time.

Systems may also comprises an indicator for giving a signal to a researcher using the system, said indicator being functionally connected to said controller, and said controller is arranged to control said indicator to give one or more signals to a researcher using the system according to a predefined experiment sequence.

Systems may also comprises an indicator for giving a signal to a researcher using the system, said indicator being functionally connected to said controller, and said controller is configured to determine from the video images if a predefined event has occurred, and if said predefined event has occurred, to control said indicator to give a predefined signal to a researcher using the system.

Systems may also comprises an indicator for giving a signal to a researcher using the system, said indicator being functionally connected to said controller, and said controller is configured to determine from the video images if a predefined event has occurred, and if said predefined event has occurred, to initiate a countdown of a predetermined time period, and after said predetermined time period has passed, to control said indicator to give a predefined signal to a researcher using the system.

Systems may also comprises a stimulus device for giving a predefined stimulus to a rodent in the maze, said stimulus device being functionally connected to said controller, and said controller is configured to determine from the video images if a predefined event has occurred, and if said predefined event has occurred, to control said stimulus device to initiate a stimulus sequence.

Systems may also comprises a stimulus device for giving a predefined stimulus to a rodent in the maze, said stimulus device being functionally connected to said controller, said controller being arranged to determine from a video image where the rodent is and in which direction the head of the rodent is directed in, and said controller being arranged to select a stimulus to be given at least in part on the basis of the determined direction of the head of the rodent.

An example of a non-transitory machine-readable medium storing a program is provided. When the program is executed by at least one processing unit of a computing system, said program causes the processing unit to provide the functionality of a control unit of a system for performing experiments with rodents in a maze. According to an embodiment of the invention, the the program comprises sets of instructions for:

receiving and storing video images from a video camera connected to the processing unit, determining a starting time by determining from video images received from the camera when a predetermined start condition is fulfilled, determining from a plurality of the video images where the rodent is and in which direction the head of the rodent is directed in each of said plurality of the video images by determining the location and direction of a triangle defined by the two ears and the snout of the rodent, and determining an ending time by determining from the video images one or more of the following: when the rodent has reached an end condition, or when the rodent is taken away from the maze.

The predetermined start condition can be for example detection of release of the rodent in the maze, detection of lifting of an enclosure, or for example detection of a rodent in an enclosure in the maze.

Some examples of such machine-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Said determination of when a rodent is released in the maze can be performed by searching for an image of an enclosure from the video images, determining the location of the enclosure from at least one video image, and determining when the enclosure is removed from the maze.

A search for determination of where the rodent is in the video images can be initiated substantially at the determined location of said enclosure.

Programs may further comprise sets of instructions for forming a video clip for later storage and analysis from video images between said starting time and said ending time.

Programs may further comprise sets of instructions for controlling an indicator connected to the processing unit, and controlling said indicator to give one or more signals to a researcher using the system according to a predefined experiment sequence.

Programs may further comprise sets of instructions for controlling an indicator connected to the controlling unit in order to give a signal to a researcher using the experimental system, for determining from the video images if a predefined event has occurred, and if said predefined event has occurred, for controlling said indicator to give a predefined signal to a researcher using the system.

Programs may further comprise sets of instructions for controlling an indicator connected to the controlling unit in order to give a signal to a researcher using the experimental system, for determining from the video images if a predefined event has occurred, and if said predefined event has occurred, for initiating a countdown of a predetermined time period, and after said predetermined time period has passed, for controlling said indicator to give a predefined signal to a researcher using the system.

Programs may further comprise sets of instructions for controlling a stimulus device connected to the processing unit, and for determining from the video images if a predefined event has occurred, and if said predefined event has occurred, for controlling said stimulus device to initiate a stimulus sequence.

Programs may further comprise sets of instructions for controlling a stimulus device connected to the processing unit, and for determining from a video image where the rodent is and in which direction the head of the rodent is directed in, for selecting a stimulus to be given at least in part on the basis of the determined direction of the head of the rodent, and for giving a selected stimulus through said stimulus device.

The invention is not limited to use with any specific type of rodents. The invention can be used in experiments with any types of rodents, such as various types of mice or rats.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. A method for performing experiments with rodents, in which experiments a rodent is placed in a maze by a researcher and behavior of the rodent is observed in darkness using infrared light and using a video camera producing a video signal, wherein the method comprising:

determining, by a computing device, a starting time by determining from video images obtained from the camera, when a predetermined start condition is fulfilled the predetermined start condition comprising detection of release of a rodent in the maze, detection of lifting of an enclosure, or detection of the rodent in the enclosure in the maze, determining, by a computing device, from a plurality of the video images, where the rodent is and in which direction the head of the rodent is directed in each of said plurality of the video images by determining a location and direction of a triangle defined by the two ears and the snout of the rodent without markers, and determining, by a computing device, an ending time by determining from the video images one or more of the following: when the rodent has reached an end condition, or when the rodent is taken away from the maze, the end condition comprising at least one of a predetermined locations of the maze.

2. A method for performing experiments with rodents according to claim 1, wherein said step of determining when a predetermined start condition is fulfilled, further comprises at least the steps of:

searching, by a computing device, for an image of an enclosure from the video images, determining, by a computing device, the location of the enclosure from at least one video image, and determining, by a computing device, when the researcher removes the enclosure from the maze.

3. A method for performing experiments with rodents according to claim 2, wherein searching, by a computing device, of the rodent in the video images after release of the rodent is initiated substantially at said determined location of said enclosure.

4. A method for performing experiments with rodents according to claim 1, wherein the method further comprises a step of forming, by a computing device, a video clip for later storage and analysis from video images between said starting time and said ending time.

5. A method for performing experiments with rodents according to claim 1, wherein said step of determination of where the rodent is and in which direction the head of the rodent is directed is performed on the basis of a formed video clip.

6. A method for performing experiments with rodents according to claim 1, wherein the researcher is given one or more signals according to a predefined experiment sequence.

7. A method for performing experiments with rodents according to claim 1, wherein the method further comprises steps of determining, by a computing device, from the video images if a predefined event has occurred, and if said predefined event has occurred, giving a predefined signal to the researcher.

8. A method for performing experiments with rodents according to claim 1, the method further comprising:

determining, by a computing device, from the video images if a predefined event has occurred, and if said predefined event has occurred, initiating a countdown of a predetermined time period, and when said predetermined time period has passed, giving a predefined signal to the researcher.

9. A method for performing experiments with rodents according to claim 1, wherein the method further comprises:

determining, by a computing device, the direction of the head of the rodent from at least one video image, and selecting a stimulus to be given at least in part on the basis of the direction of the head of the rodent.

10. A system for performing experiments with rodents in a maze, in darkness under infrared light, the system having a video camera for monitoring rodents in the maze, comprising:

a controller connected to the video camera and arranged to receive video images from the video camera and to store received video images, said controller being arranged to determine a starting time by determining from video images obtained from the camera when a predetermined start condition is fulfilled, the predetermined start condition comprising detection of release of a rodent in the maze, detection of lifting of an enclosure, or detection of the rodent in the enclosure in the maze, said controller being arranged to determine from a plurality of the video images where the rodent is and in which direction the head of the rodent is directed in each of said plurality of the video images by determining the location and direction of a triangle defined by the two ears and the snout of the rodent without markers, and said controller being arranged to determine an ending time by determining from the video images one or more of the following: when the rodent has reached an end condition, or when the rodent is taken away from the maze, the end condition comprising at least one of a predetermined locations of the maze.

11. A system according to claim 10, wherein
said controller is arranged to determine when a rodent is released in the maze by searching for an image of an enclosure from the video images,
determining the location of the enclosure from at least one video image, and
determining when the researcher removes the enclosure from the maze.

12. A system according to claim 11, wherein said controller is arranged to initiate a search for a rodent in the video images substantially at said determined location of said enclosure.

13. A system according to claim 10, wherein said controller is arranged to form a video clip for later storage and analysis from video images between said starting time and said ending time.

14. A system according to claim 10, further comprising an indicator for giving a signal to a researcher using the system, said indicator being functionally connected to said controller,
and in that said controller is arranged to control said indicator to give one or more signals to a researcher using the system according to a predefined experiment sequence.

15. A system according to claim 10, further comprising an indicator for giving a signal to a researcher using the system, said indicator being functionally connected to said controller,
and in that said controller is configured to determine from the video images if a predefined event has occurred, and if said predefined event has occurred, to control said indicator to give a predefined signal to a researcher using the system.

16. A non-transitory machine-readable medium storing a program which when executed by at least one processing unit of a computing system provides the functionality of a control unit of a system for performing experiments with rodents in a maze in darkness and under infrared light, wherein the program comprises sets of instructions for:
receiving and storing video images from a video camera connected to the processing unit,
determining a starting time by determining from video images received from the camera when a predetermined start condition is fulfilled, the predetermined start condition comprising detection of release of a rodent in the maze, detection of lifting of an enclosure, or detection of the rodent in the enclosure in the maze,
determining from a plurality of the video images where the rodent is and in which direction the head of the rodent is directed in each of said plurality of the video images by determining the location and direction of a triangle defined by the two ears and the snout of the rodent without markers, and
determining an ending time by determining from the video images one or more of the following: when the rodent has reached an end condition, or when the rodent is taken away from the maze, the end condition comprising at least one of a predetermined locations of the maze.

17. A non-transitory machine-readable medium storing a program according to claim 16, wherein said determination of when a rodent is released in the maze is performed by:
searching for an image of an enclosure from the video images,
determining the location of the enclosure from at least one video image, and
determining when the enclosure is removed from the maze.

18. A non-transitory machine-readable medium storing a program according to claim 17, wherein a search for determination of where the rodent is in the video images is initiated substantially at the determined location of said enclosure.

19. A non-transitory machine-readable medium storing a program according to claim 16, wherein the program further comprises sets of instructions for forming a video clip for later storage and analysis from video images between said starting time and said ending time.

20. A non-transitory machine-readable medium storing a program according to claim 16, wherein the program further comprises sets of instructions for:
controlling an indicator connected to the processing unit, and
controlling said indicator to give one or more signals to a researcher using the system according to a predefined experiment sequence.

* * * * *